United States Patent [19]

[11] 4,316,616

[45] Feb. 23, 1982

Boivin

[54] SELF-PROPELLING AND STEERING ATTACHMENT FOR A WHEEL-CHAIR

[76] Inventor: Bernard Boivin, 1689 Sanguinet St., Montreal, Canada, H2X 3G5

[21] Appl. No.: 124,528

[22] Filed: Feb. 25, 1980

[51] Int. Cl.³ .................................................. B62M 1/14

[52] U.S. Cl. .................... 280/289 WC; 280/242 WC; 280/250; 297/DIG. 4

[58] Field of Search ............... 280/242 WC, 289 WC, 280/233, 234, 249, 250, 271; 180/13, 16; 297/DIG. 4

[56] References Cited

U.S. PATENT DOCUMENTS

| | | | |
|---|---|---|---|
| 2,649,309 | 8/1953 | Deissner | 280/242 WC |
| 3,485,508 | 12/1969 | Hudnall | 280/250 |
| 3,485,510 | 12/1969 | Merlan | 280/250 |
| 3,912,032 | 10/1975 | Benz et al. | 280/242 WC |
| 4,108,460 | 8/1978 | Silva, Jr. | 280/271 |
| 4,109,927 | 8/1978 | Harper | 280/250 |

*Primary Examiner*—Joseph F. Peters, Jr.
*Assistant Examiner*—Donn McGiehan

[57] ABSTRACT

A self-propelling and steering attachment for a wheel-chair which can be installed and removed by the user while remaining seated in the wheel-chair and which comprises a sleeve, a steering post rotatably supported by the sleeve, a ground-engaging steering and propelling wheel carried by the lower end of the steering post, a crank mechanism carried by the top end of the steering post, a power transmission connecting the crank and the steering and propelling wheel, a framework which is quickly connectable to, and disconnectable from, the front frame portion of the wheel-chair, and a pair of superposed longitudinally-extending bars interconnecting the framework and the sleeve. The upper bar is rigid with the sleeve at one end and pivots relative to the framework at the other end. The lower bar is pivotally connected to the sleeve and to the framework and is extensible and retractable, being provided with a locking pin to lock this bar to a retracted, adjusted length. For installation of the attachment, the user first rigidly connects the framework to the wheel-chair front frame portion, while the locking pin is removed, then he pushes forwardly on the crank mechanism or on the upper portion of the steering post to cause the latter to attain a more upright position, therefore causing the front swivel wheels of the wheel-chair to raise off the ground. With this movement, the lower bar has retracted and the user then inserts the locking pin to lock the lower bar in retracted position.

9 Claims, 5 Drawing Figures

SELF-PROPELLING AND STEERING ATTACHMENT FOR A WHEEL-CHAIR

FIELD OF THE INVENTION

The present invention relates to a self-propelling and steering attachment for wheel-chairs.

BACKGROUND OF THE INVENTION

It is already known to provide attachments of the above-noted type for a wheel-chair. For instance, reference is had to U.S. Pat. No. 3,485,510, dated Dec. 23, 1979 and entitled: "Self-PROPELLING AND STEERING ATTACHMENT APPARATUS FOR A WHEELCHAIR".

Known attachments either require considerable modification of the conventional wheel-chair or removal of the user from the wheel-chair prior to the installation of the attachment.

OBJECTS OF THE INVENTION

It is therefore the general object of the present invention to provide an attachment of the character described, which can be installed and removed by the wheel-chair user himself while remaining seated in the wheel-chair.

Another object of the present invention relates to an attachment of the character described, which causes raising of the front swivel wheels of the wheel-chair off the ground during assembly of the attachment with the wheel-chair.

Another object of the present invention relates to an attachment of the character described, which may be installed on a wheel-chair of the foldable or of the rigid type and which also can be installed on wheel-chairs of different widths.

Another object of the invention relates to an attachment of the character described, in which the propelling and steering wheel is power driven through a hand-actuated crank mechanism through the intermediary of a multi-speed transmission, whereby the user can select the right transmission ratio in accordance with the slope or type of the ground on which he is travelling.

Another object of the invention resides in the provision of an apparatus of the character described, in which the position of the crank mechanism can be adjusted to suit the user.

SUMMARY OF THE INVENTION

The attachment of the invention comprises a sleeve, a steering post rotatably supported by said sleeve, a ground-engaging steering and propelling wheel carried by the bottom end of said steering post, a drive means carried by said steering post, a power transmission means connecting said drive means to said steering and propelling wheel, a rear framework having means to rigidly connect the same to, and disconnect it from, the front frame portion of a wheel-chair, a pair of superposed bars extending longitudinally forwardly from the rear framework and interconnecting the latter and said sleeve, one of said bars being extensible and retractable, and pivotally connected to said rear framework and to said sleeve for pivotal movement about horizontal transverse axes relative to said wheel-chair, and the other of said bars being rigidly secured to one of said framework and of said sleeve and pivotally connected to the other of said framework and of said sleeve for pivotal movement about a horizontal transverse axis relative to said wheel-chair, and further including means to lock the extensible and retractable bar to an adjusted length, whereby the wheel-chair user, while seated in the wheel-chair, can secure the framework to the wheel-chair front frame portion, then push forwardly on the steering post to cause the same to take a more upright position, thereby causing a change of length of the unlocked extensible bar and raising of the front swivel wheels of the wheel-chair off the ground, whereupon the user locks the extensible bar in final position.

The foregoing will become clearer by referring to the following description of a preferred embodiment and also to the drawings, wherein:

BRIEF DESCRIPTION OF THE DRAWINGS

In the drawings, like reference characters indicate like elements throughout.

DETAILED DESCRIPTION OF THE INVENTION

Figure 1:
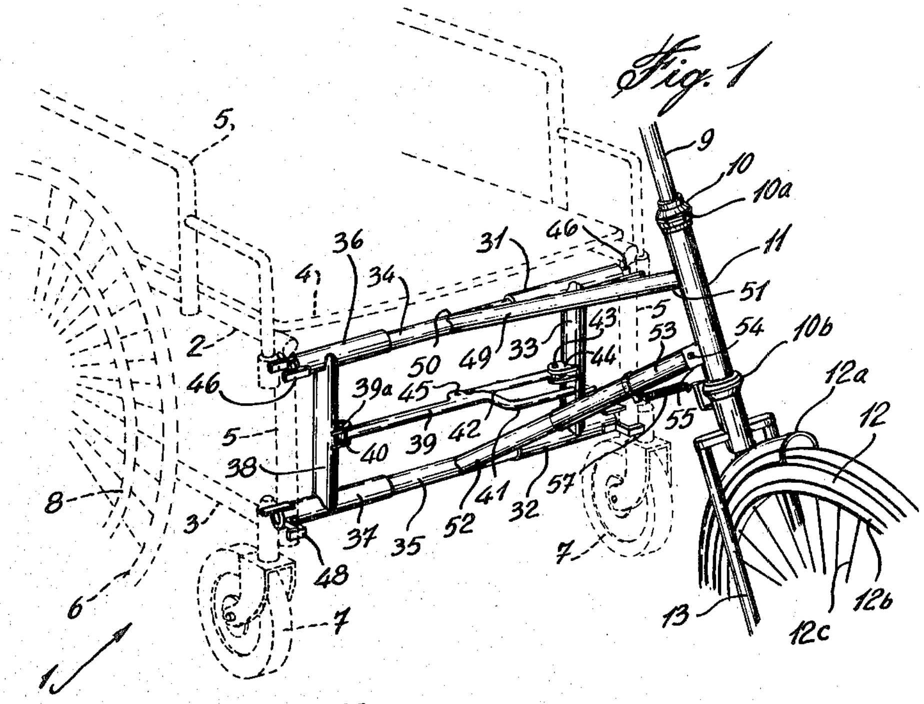
FIG. 1 is a perspective view of part of the attachment of the invention secured to the front of a wheel-chair partially shown in dotted line.

The self-propelling and steering attachment of the invention is adapted for removable installation at the front of a conventional wheel-chair of the foldable or rigid type. Such a wheel-chair is illustrated in dotted line in the drawings and comprises a frame 1 including longitudinal top and bottom lateral members 2 and 3, a foldable seat 4 extending between and connected to the top members 2, arm-rests 5 secured to the top members 2, a front wheel-chair frame portion including uprights 5 rigidly secured to the members 2 and 3 at the front ends of said members. The wheel-chair is fitted with the conventional large diameter rear driving wheels 6 and the front-mounted swivel wheels 7, of smaller diameter. This conventional chair has the usual driving rings 8 secured on the outside of the large diameter rear wheels 6, whereby the user can move about and steer the wheel-chair.

The attachment of the present invention comprises a steering post 9, of the bicycle type, which extends through a sleeve 11, being rotatably mounted within said sleeve by means of roller bearings held in position by cups 10*a* and 10*b*, there being further provided a nut arrangement 10 which positively prevents longitudinal displacement of the steering post 9 relative to the sleeve 11, while allowing free rotation of said steering post 9 relative to sleeve 11. Nut 10 also serves to adjust the longitudinal position of steering post 9 within sleeve 11.

A ground-engaging steering and propelling wheel 12 is carried by the lower end of the steering post 9 through the usual fork member 13, and this steering wheel being of the bicycle type and being fitted with the usual rim 12*b* supported by spokes 12*c*. A conventional mud-guard 12*a* partially surrounds the wheel 12 and is fixed to the lower end of the steering post between the tines of fork 13.

A crank mechanism is mounted on the upper end of the steering post 9 and a transmission interconnects the crank mechanism to the wheel 12. More specifically, a support arm 14 is secured to the top end of the steering post 9 by means of a collar 15 surrounding said steering post and clamped in position by a bolt-and-wing not assembly 16. The upper end of the support arm rotatably carries a shaft 17, to which is secured a crank mechanism including a pair of oppositely-directed crank arms 18 and a sprocket wheel 19. The outer ends of crank arm 13 are provided with handles 20. A power transmission mechanism interconnects the crank mechanism and the steering and propelling wheel 12. This transmission mechanism is of the known multi-speed type as used in bicycles. It includes a series of sprocket wheels 21, 21*a*, of decreasing diameter, fixed to the wheel hub 22, which is rotatably mounted on the axle carried by the lower ends of fork 13. The transmission further includes a chain shifter mechanism including the shifting wheel 23 and the chain tensioning wheel 24, together with the driving chain 25 which is threaded between the wheels 23 and 24 and engages around the sprocket wheel 19 and a selected sprocket wheel 21, 21*a*. The lateral position of the chain shifting wheel 23 is changed by means of a hand-operated lever 26 mounted on the upper end of the steering post 9 and connected by a flexible cable 27 to the mechanism which laterally changes the position of the shifting wheel 23.

Braking means are also provided; these braking means are similar to those used on bicycles and include an operating lever 28 mounted on the upper and of steering post 9 and actuating, through a flexible cable 29, a pair of brake shoes 30. The angular position of support arm 14 carrying the crank mechanism can be adjusted by bolt-and-wing assembly 16, so as to bring the crank mechanism into a position readily accessible to the wheel chair user.

The collar 15 can also be adjusted longitudinally of the steering post to adjust the height of the crank mechanism. The slack in the driving chain 25 is taken up by the chain-tensioning wheel 24. A U-shaped chain guard 25*a* spacedly surrounds the portion of the chain 25 in meshing engagement with sprocket wheel 19 and is fixed to arm 14 by bracket 25*b*.

The attachment of the invention further comprises a rear framework portion forming means to rigidly connect the attachment to the front frame portion of the wheel-chair.

This rear framework portion is in the form of a generally rectangular frame adapted to be positioned in the general plane of, and between, the two uprights 5 of the wheel-chair. This rectangular frame is retractable and extensible so as to be removably connected to the wheel-chair. The framework comprises upper and lower horizontal tubular members 31 and 32 rigidly interconnected by a tubular upright 33 intermediate the ends of members 31 and 32. Smaller diameter, intermediate top and bottom tubular members 34 and 35 are telescopically engaged within the respective horizontal top and bottom tubular members 31 and 32 and are rotatable therein, but prevented from longitudinal displacement relative to the same. An extensible and retractable assembly comprises top and bottom tubular members 36 and 37, which are rigidly interconnected intermediate their ends by a tubular upright 38. Members 36 and 37 telescopically engage over the respective intermediate top and bottom members 34 and 35 for movement longitudinally of these members under the action of a hand-operated toggle lever mechanism including a pair of horizontally-disposed and pivotally interconnected levers.

Figure 4:
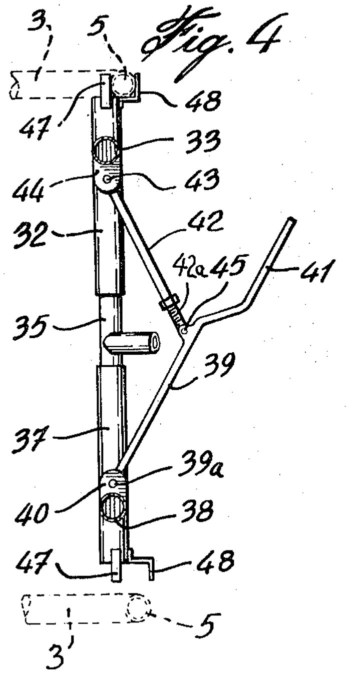
FIGS. 4 and 5 are two cross-sections taken along line 5—5 of FIG. 2 showing the framework of the attachment about to be secured and fully secured, respectively, to the front framework portion of the wheel-chair shown in dotted line.

More specifically, a first lever 39 has one end pivoted at 39*a* to ears 40 secured to upright 38 intermediate the end thereof. This lever has a crank-shaped outer end portion forming a handle 41. A second lever 42 has its inner end pivotally at 43 to ears 44 secured to an intermediate portion of upright 33, while the outer end of the second lever 42 is pivoted at 45 to ears which are integral with the lever 39 intermediate the ends thereof. It is clear, referring to FIGS. 4 and 5, that manual action exerted on handle 41 towards the frame will cause the extensible portion 36, 37, 38 to move away from the stationary portion 31 to 35. In the extended position of the framework, the pivot 45 has slightly passed the line joining the pivots 39*a* and 43. Therefore, the toggle lever remains in locked position without the aid of any spring or the like. Lever 42 has a length adjustment device 42*a*, of conventional construction, to enable adjusting the maximum length of the framework to fit, within limits, wheel-chairs of different widths.

Figure 2:
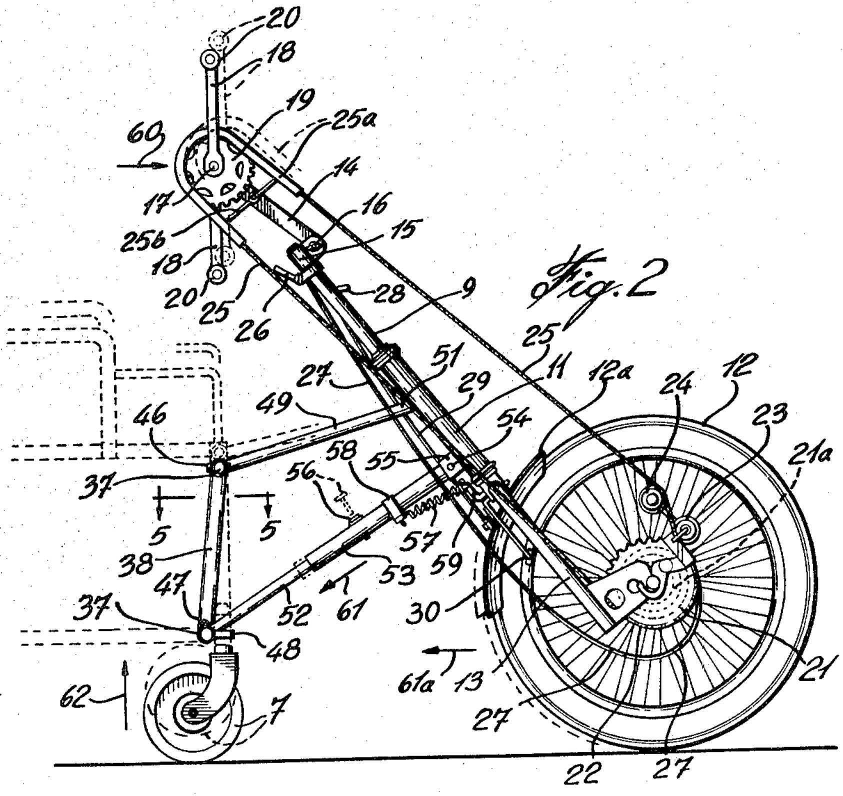
FIG. 2 is a side elevation of the attachment shown in the process of being secured to the front of a wheel-chair partially shown in dotted line.
Figure 3:
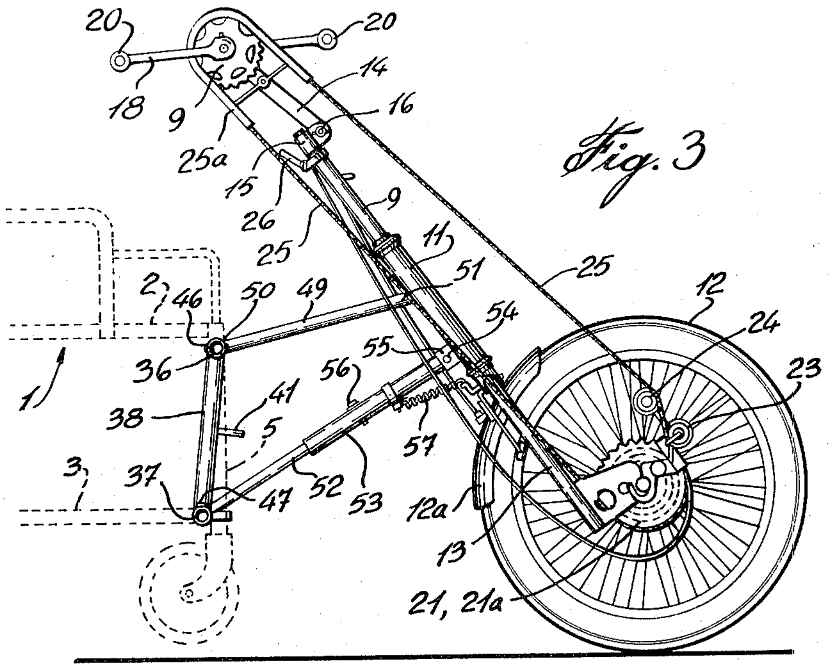
FIG. 3 is a side elevation similar to that of FIG. 2, but showing the attachment in operative position.

Referring to FIGS. 1 and 2, it will be seen that the outer ends of the top horizontal members 31 and 36 are each fitted with a pair of outwardly-projecting spaced parallel lugs 46 adapted to extend on opposite sides of uprights 5, the lugs having a slight fit with said uprights 5. Similarly, the bottom horizontal members 32 and 37 are each provided at their outer ends with an outwardly-projecting top lug 47 and a laterally- and outwardly-extending L-shaped lateral lug 48.

The top lug 47 is adapted to overlap the lower horizontal member 3 of the wheel-chair, while the lateral lug 48 is adapted to overlap the front face of the upright 5. When the framework is fixed to the wheel-chair, it becomes rigid with the frame of the latter, because lugs 46, 47, and 48 engage on both sides of the uprights 5 and, therefore, top members 31, 36 and bottom members 32, 37 cannot move forwardly or rearwardly with respect to the wheel-chair frame, and also because top lugs 46 abut underneath the top horizontal frame member 2 of the wheel-chair frame while the lugs 47 overlie the lower horizontal member 3, therefore preventing vertical displacement of the framework with respect to the wheel-chair frame.

It will be noted that the intermediate top and bottom members 34 and 35 are arranged for rotation movement about their respective longitudinal axis within the top horizontal members 31, 36 and bottom horizontal members 32, 37. However, means, not shown, are provided to prevent longitudinal displacement of the intermediate top and bottom members 34, 35 relative to the top and bottom members 31 and 32.

A pair of superposed bars, which extend longitudinally with respect to the wheel-chair centrally of the same and forwardly, serve to connect the framework attached to the wheel-chair to the sleeve 11. More specifically, straight bar 49, in the form of a rigid tube, is welded or otherwise rigidly secured to the intermediate top member 34 at 50, while the front end of top bar 49 is rigidly secured to the upper end portion of sleeve 11, as shown at 51. The lower bar is a telescopic bar made of two tubular sections, namely: an inner section 52, which is rigidly secured, such as being welded, to the bottom intermediate member 35 and extends perpendicular thereto, and an outer section 53, which is pivoted at 54 to ears 55, which are welded, or otherwise secured, to the lower portion of sleeve 11. The pivotal axis of pivot 54 is parallel to the pivotal axis of the rotational movement of the intermediate top and bottom members 34 and 35 relative to the framework assembly 31 to 38, and these axes extend horizontally transverse to the wheel-chair. A locking pin 56 is adapted to be inserted through transversely-registering holes of this section and to extend through another hole of the inner section 52 when the two sections 52 and 53 are in a predetermined retracted position.

A tension spring 57 is attached to the outer section 53 by means of a collar 58 and to the outer end of an L-shaped arm 59 secured to the lower end of steering post 9. This tension spring serves to automatically align the main wheel 12 in the central longitudinal plane of the wheel-chair and attachment assembly when the crank arms 18 are released.

Figure 5:
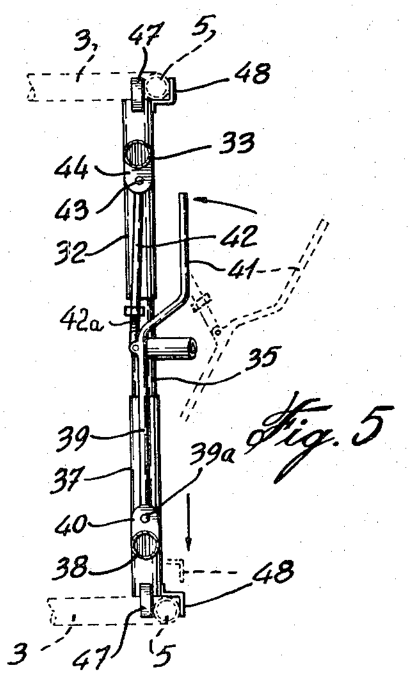

The attachment is installed on the frame of the wheel-chair in the following manner:

The wheel-chair user, while seated within the wheel-chair, can grasp the attachment normally stored in an accessible place. He removes the locking pin 56. While retaining the top bar 49, he aligns lugs 46, 47, and 48 with the respective uprights and the lower longitudinal members 3 of the wheel-chair frame. Then he operates the handle 41 of the toggle lever mechanism to extend the framework and lock the same in position secured to the front portion of the wheel-chair frame, as shown in FIGS. 2 and 5.

It will be noted that, at this stage, the front swivel wheels 7 of the wheel-chair still rest on the floor, as shown in FIG. 2. Then the user, while still seated in the wheel-chair, simply pushes on the chain guard 25*a* or on the bar 14 in a forward direction, as indicated by the arrow 60 in FIG. 2, so as to pivot the assembly of the upper bar 49, sleeve 11 and steering post 9 about the pivot axis of the intermediate top member 34 respective to the top horizontal members 31 and 36. During this movement, the sleeve 11 takes a more vertical attitude and the inner section 52 retracts within the outer section 53, as shown by arrow 61, and main wheel 12 is moved nearer the wheel-chair, as shown by arrow 61*a*, and causes lifting movement of the wheel-chair front portion and of the swivel wheels 7, as indicated by arrow 62. The user then inserts the locking pin 56 in locked position through the aligned holes of the inner and outer tubular sections 52 and 53 to lock the sections is retracted position. Obviously, the locking pin 56 can be arranged to be retained by section 53 and fitted with a spring to bias the same into locking position. Such a spring would then retain the locking pin in unlocking position and bearing against a non-perforated portion of inner section 52 when the two sections are in extended position. The pin would then automatically move into locking position when the two sections 52, 53 of the lower bar have reached their limit retracted position in which their holes are in alignment.

In such a case, the user can use both hands to grasp both crank handles for pushing forwardly.

The combination of the upper and lower bar, of the sleeve 11 and of the uprights 33 and 38, or of the uprights 5, form a deformable four-sided figure. It is essential that the telescopic bar be pivoted at both ends to the sleeve 6 and to the framework. But this telescopic bar could be arranged at the upper bar instead of being the lower bar, as shown in the drawings, in which case the rigid bar, namely upper bar 49, would become the lower bar. Moreover, it is essential that the rigid bar 49, namely the non-extensible one, be rigidly secured either to the sleeve 11, as shown in the embodiment just described, or to the framework connected to the wheel-chair frame, in which latter case the outer end of the rigid bar would be pivotally connected to the sleeve 11. In this latter embodiment, the intermediate top member 34 would be rigidly secured to the top horizontal member 31.

Since the four-sided deformable frame extends longitudinally in the central plane of the wheel-chair, it is easy for the user to straddle this frame with his two legs and to rest his legs on the usual foot-rests, not shown. Operation of the crank mechanism at a selective speed ratio enables the user to move about on even quite steep slopes and in all kinds of terrains, including gravel roads, mud- or snow-covered ground. As described hereinabove, the apparatus can be easily installed on the wheel-chair by the user himself who remains seated in the wheel-chair. It is similarly easily removed by effecting the reverse operation from that noted above, that is the crank mechanism is slightly pushed forwardly to release the locking pin which is then fully retracted, whereby the swivel wheels 7 are lowered to the ground and then the handle 41 of the toggle lever mechanism is simply pushed forwardly to retract the telescopic portion of the framework, which can then be removed from the wheel-chair frame.

The power transmission mechanism can be such as to obtain a possibility of ten different transmission ratios. It is also possible to install a battery-operated electric motor or a gasoline engine to drive wheel 12.

What I claim is:

1. A self-propelling and steering attachment for a wheel-chair of the type having a frame, rear larger diameter wheels supporting said frame and front smaller diameter swivel wheels supporting said frame at the front frame portion thereof, said attachment comprising a front sleeve, a steering post rotatably supported in said sleeve, a ground-engaging steering and propelling wheel carried by the bottom of said steering post, drive means for said steering and propelling wheel, a rear framework, means on said framework to rigidly connect and disconnect the same to and from the front frame portion of said wheel-chair, and two superposed bars extending longitudinally forwardly from said rear framework and interconnecting the latter and said sleeve, one of said bars being extensible and retractable and pivotally connected to said rear framework and to said sleeve for pivotal movement about horizontal transverse axes relative to said wheel-chair, and the other of said bars being rigidly secured to one of said framework and of said sleeve and pivotally connected to the other of said framework and of said sleeve for pivotal movement about a horizontal transverse axis relative to said wheel-chair, and means to lock said extensible and retractable bar to an adjusted length, whereby a wheel-chair user, while seated in the wheel-chair, can secure said framework to said wheel-chair front frame portion when said locking means are in released position and while said front swivel wheels of the wheel-chair rest on a support surface, and then the user can lift said swivel wheels off the ground by pushing forwardly of said steering post to cause the same to take more vertical attitude, thereby causing a change of length of said extensible and retractable bar and then locking the latter in its final position with the swivel wheels remaining raised off the supporting surface and the wheel-chair resting on said supporting surface only by the rear large diameter wheels and the steering and propelling wheel.

2. A self-propelling and steering attachment as claimed in claim 1, wherein said other of said bars is rigidly connected to said sleeve and pivotally connected to said rear framework.

3. A self-propelling and steering attachment as claimed in claim 2, wherein said other of said bars is the upper one and said extensible and retractable bar is the lower one.

4. A self-propelling and steering attachment as claimed in claim 1, 2 or 3, wherein said rear framework consists of an elongated frame including top and bottom horizontal members extending perpendicularly to, and connected to, said two superposed bars, respectively, each of said top and bottom horizontal members being made of telescopically-engaged sections, each end section of each member having endwise protruding lugs at their outer ends engageable with the front frame portion of said wheel-chair and manually-operated toggle lever means to move said telescopic sections between a retracted position clearing said front frame portion, and an extended position with the lugs firmly engaging said front frame portion of said wheel-chair, and uprights rigidly interconnecting the telescopic upper and lower sections, respectively.

5. A self-propelling and steering attachment as claimed in claim 1, 2 or 3, wherein the wheel-chair front frame portion includes top and bottom lateral, horizontally-extending members on each side of the chair, and uprights rigidly interconnecting said top and bottom members and said framework includes a generally rectangular frame adapted to extend between the two uprights of the wheel-chair frame and including top and bottom horizontal members consisting of three telescopic sections, namely two end sections and an intermediate section, said intermediate section being rigidly connected at right angles to the upper bar and being rotatably mounted within the two end sections, one section of the retractable and extensible bar being rigidly secured at right angles to the intermediate section of the lower horizontal member, uprights rigidly interconnecting the upper and lower end sections two by two, the end sections of the upper horizontal member being provided with endwise protruding lugs adapted to have a sliding fit on each side of the uprights of the wheel-chair, the end sections of the lower horizontal member being provided with rigidly secured, endwise projecting lugs adapted to engage over the lower lateral horizontal side members of the wheel-chair frame rearwardly of the uprights and lateral lugs engageable with and having a sliding fit with the front of the uprights of the wheel-chair, and a manually-operated toggle lever system interconnecting the two uprights of the framework to extend a pair of upper and lower end sections longitudinally with respect to the other pair of lower and upper end sections, so as to cause engagement of the lugs with the respective uprights and with the lower horizontal member of the wheel-chair frame.

6. A self-propelling and steering attachment as claimed in claim 1, wherein said drive means include a crank means carried by the top of said steering post, and a power transmission means including means to change the speed ratio between said crank means and said steering and propelling wheel.

7. A self-propelling and steering attachment as claimed in claim 1, 2 or 3, further including spring means biasing said steering and propelling wheel in a position in alignment with the central transverse plane of the wheel-chair fitted with the attachment.

8. A self-propelling and steering attachment as claimed in claim 6, wherein said crank mechanism is supported at the upper end of said steering post for adjustable positioning thereof to suit users having different arm lengths.

9. A self-propelling and steering attachment as claimed in claim 6, further including a support arm adjustably pivotally secured at one end to the upper end of said steering post and carrying said crank means at its other end.

* * * * *